ALVIN WILLIAM NEWBERRY
FRANK WELBORN LEHAN
INVENTORS

BY Allen E. Botney

AGENT

Nov. 13, 1962 A. W. NEWBERRY ETAL 3,064,238

DELAY LINE INTEGRATOR NETWORK

Filed March 31, 1959

2 Sheets-Sheet 2

FRANK WELBORN LEHAN
ALVIN WILLIAM NEWBERRY
INVENTORS

BY Allen E. Botney

AGENT

United States Patent Office 3,064,238

Patented Nov. 13, 1962

3,064,238

DELAY LINE INTEGRATOR NETWORK

Alvin William Newberry and Frank Welborn Lehan, Glendale, Calif., assignors, by mesne assignments, to Space-General Corporation, Glendale, Calif., a corporation of California Filed Mar. 31, 1959, Ser. No. 803,233
2 Claims. (Cl. 340—167)

The present invention relates in general to signal recognition devices employed in communication systems and more particularly to a delay line integrator network capable of identifying digitalized transmissions in a variety of patterns.

Whenever information in the form of electrical signals is transmitted to a distant receiver site, the problem of distinguishing the received signals from noise and other interfering effects that may be present is encountered. This problem is especially acute where the data received is in digitalized form since, in addition to noise and other forms of interference, multipath delay effects may also prevent accurate recognition of the message. By "digitalized" is meant a plurality or group of pulses having a predetermined timing sequence, the information residing in the particular time spacing between pulses.

One technique that has been employed in the past for alleviating this problem involves the use of a delay line of one type or another having a plurality of taps, or devices equivalent to taps, therealong, the taps being spaced from each other in such a manner that a group of information pulses applied serially to the delay line will simultaneously appear at its taps. When this occurs, the pulses are then either arithmetically added or averaged to produce a single recognition pulse whose amplitude is considerably greater than that of the individual group pulses, thereby exceeding a predetermined threshold at the output. Thus, the signal-to-noise ratio is very greatly increased and multipath effects substantially reduced, thereby permitting recognition. Apparatus of this kind are generally referred to as delay line integrators and occasionally as asynchronous correlation detectors. By way of example, a magnetostrictive delay line type of apparatus for improving signal-to-noise ratio in this manner is shown and described in U.S. Patent 2,612,603, entitled "Signal-to-Noise Ratio in Pulse Reception," invented by M. G. Nicholson, Jr. and issued September 30, 1952.

A principal shortcoming of all these prior art types of circuits and devices is that they are restricted in their operation to a fixed pattern of time spacing between pulses and, furthermore, to pulses of a single polarity. Thus, they are inflexible to the extent that if the time spacing between pulses should vary from a predetermined pattern, then all the pulses would not be simultaneously presented and the set threshold voltage might not be exceeded. Similarly, where it is desired to change the timing pattern for some reason or other, it is then necessary to provide a new delay line device whose taps are spaced therealong in accordance with the new pulse timing code. Furthermore, it will be obvious that the total number of messages or bit sof information that may be communicated is limited by the fact that operation is confined to pulses of a single polarity, either all negative or all positive.

It is, therefore, an object of the present invention to provide a delay line integrator network for improving the signal-to-noise ratio in the reception of pulses transmitted according to any one of a number of prescribed timing sequences.

It is another object of the present invention to provide a delay line integrator network for identifying digitalized information transmitted in a variety of timing patterns.

It is an additional object of the preesnt invention to provide a delay line integrator network that is operable with pulse transmissions of both positive and negative polarity.

It is a further object of the present invention to provide a delay line integrator network that is capable of taking serially applied pulses of both positive and negative polarity and of a variable pulse repetition rate and presenting groups of these pulses in parallel and in only one polarity.

The present invention obviates the limitations of earlier types of delay line integrator devices by combining a multi-tapped delay line with a cross-connection matrix having a plurality of output terminals. The abovesaid combination is able to recognize and respond to any one of a plurality of signal pattern sequences by producing a strong signal at the proper output terminal.

More particularly, a first set of wires equal in number to the number of delay line taps are respectively connected to the taps. A second set of wires equal in number to the number of different bits of information, messages, or commands transmitted is non-conductively crossed with the first set of wires in a sort of checker-board fashion. By suitably connecting wires of one set with those of the other set at points whereat they cross or intersect, a number of wire connection patterns can be formed. Accordingly, when a signal comprising several pulses flows down the delay line and has its pattern aligned with the corresponding wire connection pattern, a strong output pulse is produced at an associated one of the matrix output terminals. With noise and with signals in improper registration, no such large output pulse is produced. Hence, through such a combination, large numbers of signal patterns representing a correspondingly large number of bits of information, messages or commands may be recognized against the background of noise and other undesirable signals.

In one embodiment of the invention, namely, one in which a magnetostrictive delay line is employed, pulses of both positive and negative polarity may be included in the same signal pattern. This is made possible by center-tapping the pickup or readout coils wound about the magnetostrictive delay line since, under such circumstances, the polarity of voltages developed at the coils can be reversed by selection of the proper coil terminal for connection to the matrix. Moreover, this embodiment has the further advantage in that, by making the pickup coils movable along the line, new signal patterns or timing sequences can be accommodated, thereby providing a high degree of flexibility. The advantage of flexibility as mentioned above is also obtained from other embodiments of the present invention as, for example, wherein a tape recorder is utilized as a delay line.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
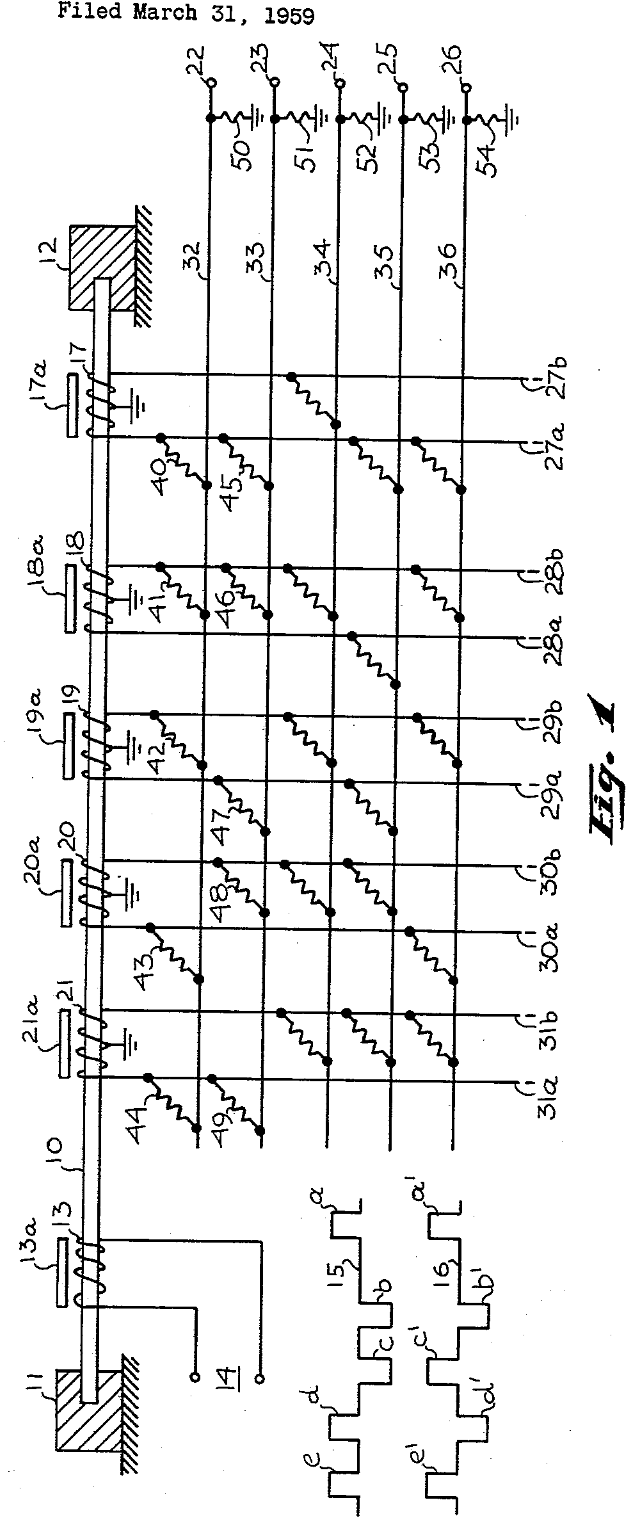
FIG. 1 shows one embodiment of a delay line integrator network according to the present invention.

Referring now to the drawings and in particular to the embodiment of FIG. 1, there is shown a rod 10 having magnetostrictive properties, by which is meant that the rod has the property of undergoing mechanical variation of its physical dimensions, that is, elongation and contraction, with change of magnetic flux through it. Thus, the application of an electrical pulse or wave to a coil related or coupled to the rod will produce the magnetostriction effect, the resulting deformation being propagated as a wave along the rod at a velocity approximating that of sound through air. Rod 10 is supported at its ends by fixed bodies 11 and 12 made of a suitable damping material, such as rubber or beeswax, so that compressional waves reaching the end of the rod will not be reflected back to any troublesome extent. Wound around rod 10, preferably near one end thereof, is an input coil 13 to whose terminals the various signal patterns are applied. A magnet 13*a* is asosciated with coil 13 for the purpose of impressing an initial magnetic field on rod 10 at that point. This magnetic field acts as a bias and permits negative as well as positive signals to be propagated down the rod. The coil terminals are generally designated 14 and examples of signal patterns that may be applied thereto are designated 15 and 16. A number of other coils, namely, output coils 17 to 21, are also wound on rod 10 at spaced distances therealong, the distances between these coils corresponding to the time spacing between the pulses of the signals applied to coil 13, such as signal patterns 15 and 16 heretofore mentioned. As shown in the figure, coils 17 to 21 are center-tapped to ground for reasons that will be more fully understood later. Magnets are also associated with coils 17 to 21 and are designated 17*a* to 21*a*, respectively.

The embodiment of FIG. 1 further includes a matrix comprising two sets of wires, one set of wires being connected to output coils 17 1to 21 at their terminals and the other set of wires being connected to a plurality of matrix output terminals designated 22 to 26. The set of wires connected to the terminals of coils 17 to 21 are respectively designated 27*a* and 27*b*, 28*a* and 28*b*, 29*a* and 29*b*, 30*a* and 30*b*, and 31*a* and 31*b*; whereas the set of wires connected to output terminals 22 to 26 are respectively designated 32 to 36. As shown in the figure, these two sets of wires are preferably positioned so as to intersect or cross each other in checkerboard fashion but are nevertheless non-conductive with respect to each other by being either spaced or insulated from each other.

A plurality of resistors are connected between the two sets of wires at selected points of intersection, the points of intersection being chosen in such a manner that a plurality of wire connection patterns are formed that respectively correspond to the plurality of signal patterns that may be applied to input coil 13, as will be more clearly understood from the description that follows. Thus, for example, the plurality of resistors designated 40 to 44 are connected as follows, namely, resistor 40 is connected between wires 27*a* and 32, resistor 41 is connected between wires 28*b* and 32, resistor 42 is connected between wires 29*b* and 32, resistor 43 is connected between wires 30*a* and 32, and resistor 44 is connected between wires 31*a* and 32. Resistors 40 to 44 correspond to pulses *a* to *e*, respectively, of signal pattern 15 and it will be noted that these resistors are connected to the "*a*" wires in the first set (27*a*, 30*a*, etc.) when their corresponding pulses are of positive polarity and to the "*b*" wires when their corresponding pulses are of negative polarity. Thus, resistors 40 to 44 form a first wire connection pattern.

Similarly, the plurality of resistors designated 45 to 49 form a second wire connection pattern and are connected as follows, namely, resistor 45 is connected between wires 27*a* and 33, resistor 46 is connected between wires 28*b* and 33, resistor 47 is connected between wires 29*a* and 33, resistor 48 is connected between wires 30*b* and 33, and resistor 49 is connected between wires 31*a* and 33. Here again, resistor 45 to 49 correspond to pulses *a'* to *e'*, respectively, of signal pattern 16 and, as before, the resistors are connected to "*a*" wires when their corresponding pulses are of positive polarity and to "*b*" wires when their corresponding pulses are of negative polarity.

Still other resistors are connected between the two sets of wires as shown in the figure, and, in the manner described, these other resistors form additional wire connection patterns that correspond to signal patterns other than 15 or 16. A plurality of load resistors, designated 50 to 54, are also connected between wires 32 to 36, respectively, and ground.

Considering now the operation, when an electrical pulse is applied to terminals 14 of input coil 13, a compression or rarefaction is started down rod 10 depending on whether the pulse is positive or negative, respectively. This wave travels down the rod at substantially the speed of sound in air and as the wave passes each one of output coils 17 to 21 it induces a pulse thereacross that is like the one applied to terminals 14. Consequently, whenever a signal comprising a plurality of pulses arranged in a particular pattern with respect to the polarity of and the time spacing between the pulses is applied to input coil 13, the signal flows down rod 10 until the referred-to signal pattern is properly aligned with the corresponding wire connection pattern, at which time a strong output pulse is produced at the associated output terminal.

Thus, for example, if signal 15 comprising electrical pulses *a* to *e* is applied to input coil 13 via terminals 14, the pulses flow down rod 10 in the form of a succession of waves which induce like electrical pulses across each output coil that they pass. The amplitude of the pulses thus induced are of the same order of magnitude as the originally applied pulses. Since the distance spacing between output coils 17 to 21 correspond to the time spacing between pulses *a* to *e*, at one point in time the waves generated by these pulses are simultaneously opposite the output coils. As a result, electrical pulses *a* to *e* of signal 15 are simultaneously induced across coils 17 to 21, respectively. In other words, positive pulses *a*, *d* and *e* are respectively induced across coils 17, 20 and 21, and negative pulses *b* and *c* are respectively induced across coils 18 and 19.

Pulses induced across coils 17 to 21 result in pulses being developed across resistors 40 to 44, respectively. However, it will be obvious to those skilled in the art that since the output coils are center-tapped to ground and, furthermore, since resistors 41 and 42 are connected to "*b*" wires (28*b* and 29*b*) rather than to "*a*" wires (28*a* and 29*a*) as are resistors 40, 43 and 44, the polarity of the pulses induced across coils 18 and 19 are opposite to that of the pulses produced across associated resistors 41 and 42. Hence, since pulses *b* and *c* of signal 15 are of negative polarity, the corresponding pulses produced across resistors 41 and 42 are of positive polarity. On the other hand, the pulses produced across resistors 40, 43 and 44 are of the same polarity as original pulses *a*, *d* and *e*, namely, positive. Accordingly, the pulses simultaneously produced across resistors 40 to 44 are all of positive polarity, with the result that an output pulse of substantially large amplitude is produced across associated load resistor 50 at output terminal 22. The output pulse may then be applied to a threshold device (not shown) connected to terminal 22.

The operation as described above is equally valid when signals having pulse patterns different than that of signal 15 are applied to the network of FIG. 1. Thus, for example, if signal 16 is applied to input coil 13, pulses *a'* to *e'* would ultimately be induced across output coils 17 to 21, respectively, and pulses would therefore also be produced across resistors 45 to 49. Here again, however, for the reasons already mentioned, the polarity of the pulses produced across resistors 46 and 48 would be opposite to that of pulses *b'* and *d'* and the polarity of the pulses produced across resistors 45, 47 and 49 would be the same as that of pulses *a'*, *c'* and *e'*. It will be seen, therefore, that the pulses produced across resistors 45 to 49 would all be of positive polarity, with the result that a pulse of large amplitude would be developed at output terminal 23. Signals of still other pulse patterns would, in the same manner, cause pulses of relatively large amplitude to be applied to the remaining output terminals, namely, terminals 24, 25 and 26.

As to noise signals and signals in improper registration with output coils 17 to 21, no large output pulse is produced. Furthermore, the compressional waves continue their flow down rod 10 until they reach structure 12 where they are damped to the extent that practically no reflections occur.

It should be noted that elements other than resistors, such as diodes, may be used in the matrix with equally good effect. It should further be noted that the output coils may, in a simple manner, be mounted to be movable along the rod and, when they are so mounted, the time spacing between pulses in the signals applied to the network may be varied in any desired manner. This makes possible the transmission of an increased number of messages or bits of information.

Figure 2:
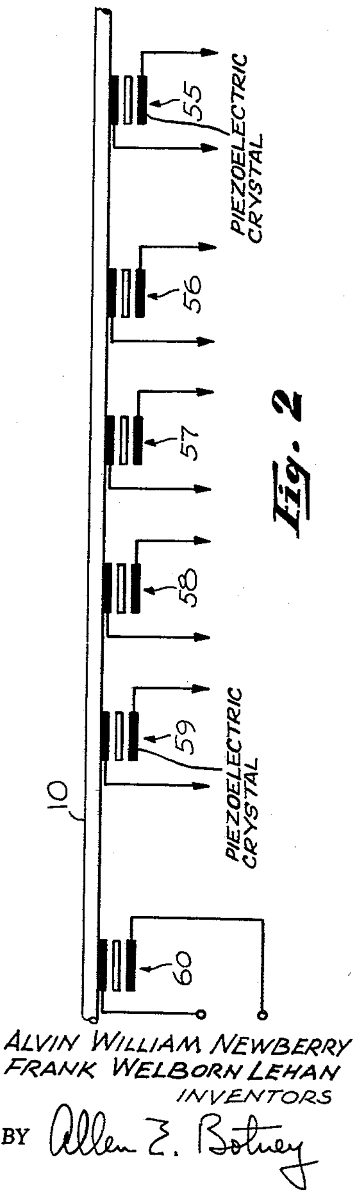
FIG. 2 shows a modified arrangement for the embodiment of FIG. 1.

Finally, it should be noted that devices other than coils may be used for input and output purposes. In this respect, FIG. 2 shows a modification of the arrangement in FIG. 1 in which piezoelectric crystals are used instead of coils. Thus, crystal 55 is the input element and crystals 56 to 60 are the output elements. The matrix attached to the crystals is not shown since the matrix would be the same as in FIG. 1.

Figures 3, 4, 5:
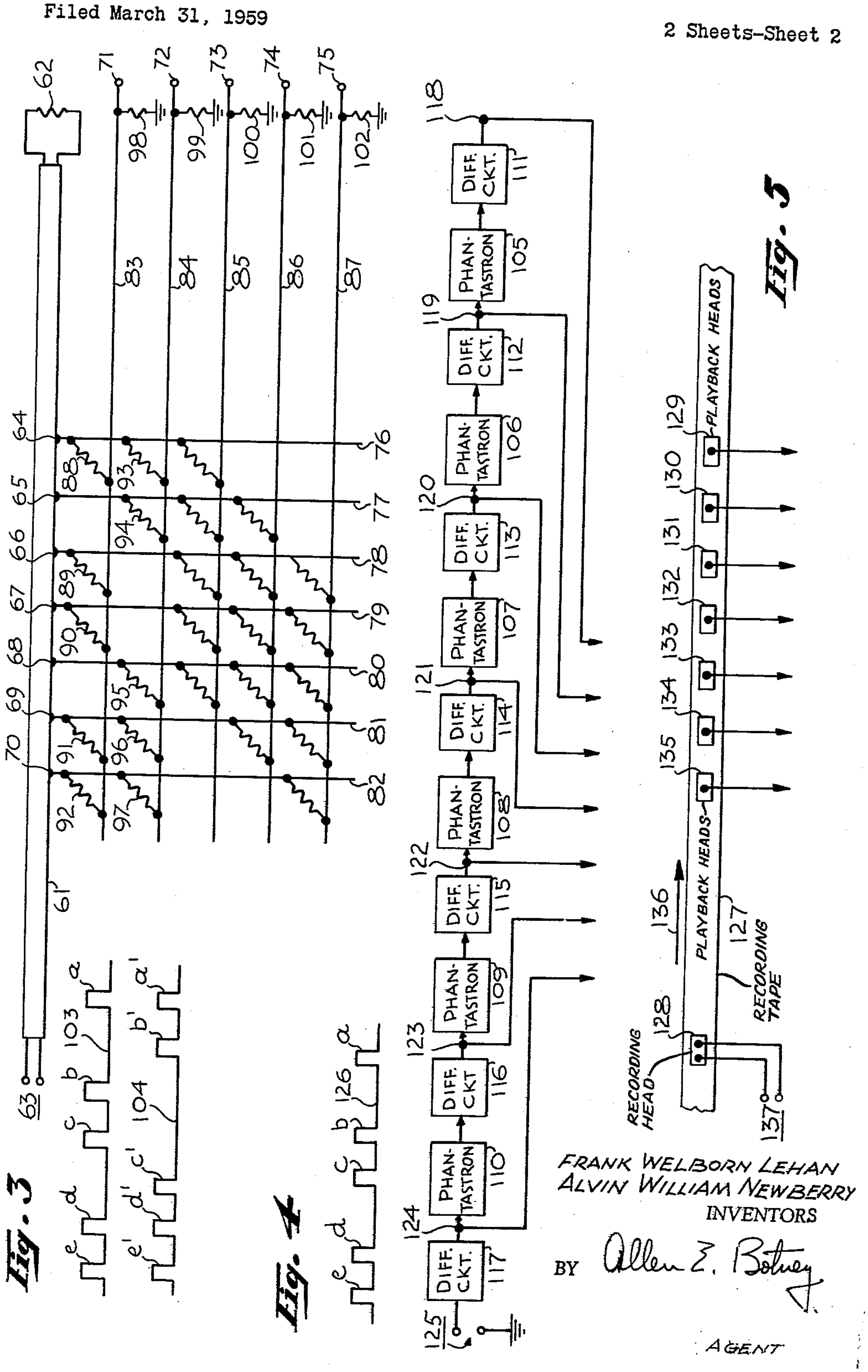
FIG. 3 shows another embodiment of a delay line integrator network according to the present invention.
FIG. 4 shows still another embodiment of a delay line integrator network according to the present invention.
FIG. 5 shows a fourth embodiment of a delay line integrator network according to the present invention.

Referring now to FIG. 3, there is shown another embodiment of the present invention, this embodiment comprising a multi-tapped transmission line type of delay line 61 which is terminated in its characteristic impedance as represented by a resistor 62 at the output end of the line. The input terminals of delay line 61 are generally designated 63 and the plurality of delay line taps are designated 64 to 70 inclusive. With respect to the delay line taps, they are spaced from each other according to the time spacings encountered between pulses of the signal patterns applied to the network. Thus, delay line taps 64 to 70 may be equally or unequally spaced from each other. For illustrative purposes, the delay line taps shown in FIG. 3 are substantially equally spaced from each other, that is to say, the delays between successive taps are equal.

A matrix similar to the matrix of FIG. 1 is connected between taps 64 to 70 and a plurality of output terminals 71 to 75. Thus, the matrix of FIG. 3 includes a first set of wires 76 to 82 connected to taps 64 to 70, respectively, and a second set of wires 83 to 87 connected to output terminals 71 to 75, respectively, the two sets of wires being interconnected, as before, through a plurality of resistors, the points of interconnection forming a plurality of wire connection patterns that respectively correspond to a plurality of signal patterns. By way of example, the resistors designated 88 to 92 respectively interconnect wires 76, 78, 79, 31 and 82 to wire 83 and the resistors designated 93 to 97 respectively interconnect wires 76, 77, 80, 81 and 82 to wire 84, the interconnections through resistors 88 to 92 forming a first wire connection pattern and the interconnections through resistors 93 to 97 forming a second such pattern. Interconnections through other resistors that are not designated form still other wire connection patterns. A plurality of load resistors, designated 98 to 102, are also connected between wires 83 to 87, respectively, and ground.

In operation, if signal 103 having pulses *a* to *e* is applied to input terminals 63, the pulses will be successively propagated down delay line 61 until they are respectively or simultaneously produced at taps 64, 66, 67, 29 and 70. These pulses appear simultaneously at the taps designated because the delay times between the taps are respectively equal to the time intervals between the pulses. More specifically, the delay time between taps 64 and 66 is equal to the time spacing between pulses *a* and *b*, the delay time between taps 66 and 67 being equal to the time spacing between pulses *b* and *c*, etc. When pulses *a* to *e* are produced at taps 64, 66, 67, 69 and 70, they are also simultaneously produced across resistors 88 to 92 with the result that a pulse of relatively large amplitude is produced across load resistor 98, that is, at output terminal 71.

For similar reasons, if signal 104 is applied to input terminals 63, then pulses *a'* to *e'* thereof would simultaneously appear at taps 64, 65, 68, 69 and 70 and simultaneously be developed across resistors 93 to 97, thereby causing a large amplitude pulse to be produced at output terminal 72. If signals having pulse patterns other than those of signals 103 and 104 are applied to delay line 61, then output pulses will be produced at still other output terminals, such as terminals 73, 74 and 75. As mentioned before, the output pulses may be used to trigger threshold devices that may be connected to the output terminals.

Delay line integrator networks according to the present invention that employ delay lines different than heretofore described are shown in FIGS. 4 and 5. In the embodiment of FIG. 4, the delay line consists of a plurality of phantastron circuits interleaved between a plurality of differentiating circuits. The phantastron circuits are designated 105 to 110 whereas the differentiating circuits are designated 111 to 117. The phantastron delay line of FIG. 4 is tapped at a number of points, namely, at the output of each differentiating circuit, and is connected at these taps to a matrix of the type shown in FIG. 3. The taps herein are designated 118 to 124 and the input terminals to the delay line are designated 125.

With respect to the operation, it is well known that upon being triggered, a phantastron is capable of producing either a positive or negative pulse of very accurate duration. Accordingly, by using negative pulses produced by phantastrons 105 to 110 and by adjusting the phantastrons so that the pulse durations correspond to the time intervals between pulses of signals applied to the delay line, pulses corresponding to the applied signal pulses can be simultaneously produced at taps 118 to 124. This result is obtained by differentiating each phantastron pulse and then using the resulting positive voltage spike corresponding to the lagging edge of each such phantastron pulse to trigger the next phantastron circuit into operation. By so doing, the desired time delays are obtained.

More particularly, if signal 126 is applied to input terminals 125, plus *a* thereof is differentiated by differentiating circuit 117, thereby producing positive and negative voltage spikes corresponding, respectively, to the leading and lagging edges of pulse *a*. The positive voltage spike triggers phantastron circuit 110 which thereby produces a negative pulse of a predetermined duration equal to the time interval between pulses *d* and *e*. This negative pulse is then differentiated by differentiating circuit 116 to thereby produce negative and positive voltage spikes corresponding, respectively, to the leading and lagging edges of the pulse. The positive voltage spike thus produced is then employed to trigger phantastron circuit 109, whereby a time delay is introduced equal to the duration of the pulse produced by phantastron 110, that is, equal to the time spacing between pulses *d* and *e* of signal 126.

This process is continued until a positive voltage spike is produced at the delay line output, that is, at tap 118. When this occurs, the total time delay introduced is equal to the sum of the time durations of all the pulses produced by phantastrons 105 to 110 as a result of the application of pulse *a*. Furthermore, by the time a positive voltage spike corresponding to pulse *a* is produced at tap 118, positive voltage spikes corresponding to pulses *b* to *e* of signal 126 are respectively produced at taps 120, 121, 123 and 124, these latter voltage spikes being produced in the manner described. In consequence of all the voltage spikes being produced simultaneously, the desired pulse is obtained at the matrix output.

It will be obvious that signals having other pulse patterns will also produce the desired results, except that for these other signal patterns voltage spikes will be simultaneously produced at other combinations of taps. It will be equally obvious that instead of the signal pulses applied to input terminals 125 being all positive, they may all be negative in which case the negative rather than the positive spikes out of differentiating circuit 117 are used to trigger phantastron 110. Furthermore, it will be recognized that since the phantastrons may be adjusted to produce pulses of any duration, the pulse patterns of the signals applied to the network may be rearranged to take care of the transmittal of large numbers of commands, messages or bits of information.

Referring now to the embodiment of FIG. 5, the delay line shown therein comprises a recording tape 127, a recording head 128 and a plurality of playback heads designated 129 to 135. Tape 127 preferably moves in the direction of arrow 136, that is toward playback heads 129 to 135 and away from recording head 128 which is connected to input terminals 137. The outputs of the delay line are the outputs of playback heads 129 to 135 and they are connected to a matrix also of the type shown in FIG. 3.

In operation, when a signal of the type illustrated in FIGS. 3 and 4, such as signals 103 and 104 in FIG. 3 and signal 126 in FIG. 4, is applied to input terminals 137, the signal pulses are successively recorded on tape 127 by head 128. Due to the motion of the tape, there will be a point of time when the recorded pulses are simultaneously aligned with a particular combination of heads 129 to 139. In accordance with previous explanations, when this alignment occurs, a pulse is produced at the appropriate output terminal of the matrix connected to the heads and this pulse may be used to trigger a threshold device. Thus, here again signal-to-noise ratio is increased and signal patterns representing messages or bits of information may be recognized above the noise. In this case too, the pulses may be either of negative or positive polarity.

In each of the embodiments described the matrix was shown to comprise a specific number of busses or wires corresponding to the number of delay line outputs and the number of network outputs. These, as has been mentioned, depend upon the number of different massages or bits of information to be transmitted. Hence, it will be recognized that to transmit an increased number of messages or bits of information, it is necessary only to increase the number of matrix wires to form additional wire connection patterns.

It should also be noted that although the embodiments of the present invention were described as receiving signals from which output recognition pulses are produced, the process may be reversed so that signals having desired pulse patterns may be produced by applying suitable pulses to their output terminals. Thus, by way of example, if a pulse is applied to output terminal 22 in FIG. 1, pulses will simultaneously be produced at coils 17 to 21 and signal 15 will ultimately be obtained at input terminals 14 of coil 13. The same results may be expected with respect to the embodiments of FIGS. 2, 3 and 5 if the process is reversed as noted. In connection with the embodiment of FIG. 4, the same results may be expected hereto except that the signal will be produced at output terminal 18 rather than at input terminals 25. Thus, the embodiments herein described may be used for coding as well as for recognition purposes.

Finally, it should be mentioned that notwithstanding the type of pulse shown and used herein to illustrate the invention, the word "pulse" has a broader meaning than that intimated in that it includes within its meaning other types of signals as, for example, a pulse of the $$\frac{\text{Sin } X}{X}$$

type. Again, the positive loops or half cycles of a sinusoidal oscillation are encompassed by the term "pulse," as well as the negative loops of such a signal. Consequently, the word "pulse" as used in the claims appended hereto should be construed in its broadest context as just explained.

Having thus described the invention, what is claimed as new is:

1. A delay line integrator network for producing a recognition pulse in response to a train of serially applied pulses whose periodicity and polarity vary in accordance with any one of a plurality of code patterns, said network comprising: a magnetostrictive delay line including a magnetostrictive rod and means for magnetically biasing said rod, an input coil wound on said rod for receiving the train of pulses, and a plurality of output coils center-tapped to produce positive and negative pulses at the ends thereof wound on said rod, said output coils being spaced along said rod in such a manner that the successive time delays of at least one combination thereof vary as the periodicity of the applied train of pulses, whereby the serially applied pulses are simultaneously produced at said one combination of output coils; and an electrical matrix for producing a recognition pulse whose amplitude corresponds to the sum of the absolute values of the amplitudes of the pulses simultaneously produced at a combination of said output coils, said matrix including a plurality of wires respectively coupled to the ends of said plurality of output coils, the polarity of the pulses produced between the wires connected to the ends of an output coil and the center-tap thereof being respectively the same as and opposite to the polarity of the pulse when produced across said input coil, a plurality of output lines equal in number to the plurality of code patterns, and a plurality of resistors connected between each output line and selected ones of said wires to produce pulses of the same polarity across said resistors corresponding to the pulses simultaneously produced at the associated combination of output coils.

2. A delay line integrator network for producing a recognition pulse in response to a train of serially applied pulses whose periodicity and polarity vary in accordance with any one of a plurality of code patterns, said network comprising: a magnetostrictive delay line including a magnetostrictive rod, means for magnetically biasing said rod, an input coil wound on said rod for receiving the train of pulses, and a plurality of output coils center-tapped to produce positive and negative pulses at the ends thereof wound on said rod, said output coils being spaced along said rod in such a manner that the successive time delays of at least one combination thereof vary as the periodicity of the applied train of pulses, whereby the serially applied pulses are simultaneously produced at said one combination of output coils; and an output circuit coupled to each combination of output coils at the ends thereof, said output circuits being connected to said output coils in such a manner as to reverse the polarity of those pulses in the applied pulse train that are of opposite polarity to the other pulses in said train, thereby to simultaneously produce said pulses at the same polarity, and means for combining the pulses simultaneously produced by an output circuit in such a manner as to produce a recognition pulse whose amplitude corresponds to the sum of the absolute values of the amplitudes of the pulses simultaneously produced across the associated output coil combination.

(References on following page)

References Cited in the file of this patent

UNITED STATES PATENTS

| | | |
|---|---|---|
| 2,495,740 | Labin et al. | Jan. 31, 1950 |
| 2,522,609 | Gloess | Sept. 19, 1950 |
| 2,615,992 | Flory et al. | Oct. 28, 1952 |
| 2,616,983 | Zworykin et al. | Nov. 4, 1952 |
| 2,686,299 | Eckert | Aug. 10, 1954 |
| 2,779,933 | Bradburd | Jan. 29, 1957 |
| 2,800,584 | Blake | July 23, 1957 |
| 2,855,585 | Quinby | Oct. 7, 1958 |
| 2,924,812 | Merritt et al. | Feb. 9, 1960 |
| 2,927,303 | Elbinger | Mar. 1, 1960 |

FOREIGN PATENTS

| | | |
|---|---|---|
| 494,938 | Italy | June 7, 1954 |